United States Patent
Toda et al.

(10) Patent No.: US 9,327,604 B2
(45) Date of Patent: May 3, 2016

(54) ELECTRIC VEHICLE CONTROL APPARATUS AND ELECTRIC VEHICLE

(71) Applicant: KABUSHIKI KAISHA TOSHIBA, Minato-ku, Tokyo (JP)

(72) Inventors: Shinichi Toda, Tokyo (JP); Ikuo Yasuoka, Tokyo (JP); Kazuaki Yuuki, Saitama-ken (JP); Yasufumi Mochizuki, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/321,298

(22) Filed: Jul. 1, 2014

(65) Prior Publication Data

US 2014/0312810 A1 Oct. 23, 2014

Related U.S. Application Data

(63) Continuation of application No. PCT/JP2012/003954, filed on Jun. 18, 2012.

(30) Foreign Application Priority Data

Jan. 5, 2012 (JP) .................................. 2012-000781

(51) Int. Cl.
*H02P 27/04* (2006.01)
*B60L 11/18* (2006.01)
(Continued)

(52) U.S. Cl.
CPC ........... *B60L 11/1801* (2013.01); *B60L 3/0046* (2013.01); *B60L 9/28* (2013.01);
(Continued)

(58) Field of Classification Search
CPC ............. B60L 1/00; B61C 3/00; H02M 3/335
USPC ............ 318/139, 400.01, 599, 801, 811, 722, 318/800; 105/26.05; 180/65.31; 363/34, 37, 363/48, 52, 61, 64, 65, 67, 84, 108, 124, 40, 363/95; 327/124; 388/920
See application file for complete search history.

(56) References Cited

U.S. PATENT DOCUMENTS 7,982,426 B2 * 7/2011 Itoh ..................... H02M 7/5387
318/108
8,297,389 B2 * 10/2012 Takizawa ................ 180/65.265
(Continued)

FOREIGN PATENT DOCUMENTS

JP 09130995 A 5/1997
JP 2002369308 A 12/2002
(Continued)

OTHER PUBLICATIONS

International Search Report (ISR) dated Sep. 25, 2012 issued in International Application No. PCT/JP2012/003954.
(Continued)

*Primary Examiner* — Antony M Paul
(74) *Attorney, Agent, or Firm* — Holtz, Holtz & Volek PC

(57) ABSTRACT

According to one embodiment, an electric vehicle control apparatus is provided with a converter having a diode and a switching device which convert an AC voltage or a DC voltage supplied from an input side into a DC voltage, whose output side is connected to a main motor through an inverter, a battery connected to the converter through a reactor, to provide a power source for the main motor, and a boosting chopper circuit composed the diode and the switching device which the converter has, so as to boost a voltage of the battery.

8 Claims, 10 Drawing Sheets

(51) Int. Cl.
  *B60L 15/00* (2006.01)
  *B60L 3/00* (2006.01)
  *B60L 9/28* (2006.01)
  *B60L 15/02* (2006.01)
  *B60L 15/20* (2006.01)

(52) U.S. Cl.
  CPC ........ *B60L 11/1803* (2013.01); *B60L 11/1861* (2013.01); *B60L 15/007* (2013.01); *B60L 15/025* (2013.01); *B60L 15/20* (2013.01); *B60L 2200/26* (2013.01); *B60L 2210/14* (2013.01); *B60L 2210/30* (2013.01); *B60L 2210/40* (2013.01); *B60L 2240/12* (2013.01); *B60L 2240/423* (2013.01); *B60L 2240/547* (2013.01); *B60L 2240/549* (2013.01); *B60L 2270/20* (2013.01); *Y02T 10/7005* (2013.01); *Y02T 10/7241* (2013.01)

(56) References Cited

U.S. PATENT DOCUMENTS 8,453,814 B2 * 6/2013 Gambach et al. ................ 191/3
2010/0201294 A1 * 8/2010 Yuuki et al. ................ 318/400.3
2011/0011300 A1 * 1/2011 Gambach et al. ............... 105/49
2011/0011658 A1 * 1/2011 Takizawa ................... 180/65.31

FOREIGN PATENT DOCUMENTS

| JP | 2007295720 A | 11/2007 |
|---|---|---|
| JP | 2010252524 A | 11/2010 |
| JP | 2011004566 A | 1/2011 |

OTHER PUBLICATIONS

Chinese Office Action (and machine English translation thereof) dated Sep. 25, 2015, issued in counterpart Chinese Application No. 201280066006.8.

Japanese Office Action (and English translation thereof) dated Dec. 8, 2015, issued in counterpart Japanese Application No. 2012-289085.

* cited by examiner

US 9,327,604 B2

ELECTRIC VEHICLE CONTROL APPARATUS AND ELECTRIC VEHICLE

CROSS-REFERENCE TO RELATED APPLICATION

This application is based upon and claims the benefit of priority from the prior Japanese Patent Application No. 2012-000781, filed on Jan. 5, 2012; the entire contents of which are incorporated herein by reference. This application is a continuation application of International Patent Application No. PCT/JP2012/003954, filed on Jun. 18, 2012.

FIELD

Embodiments described herein relate to an electric vehicle control apparatus and an electric vehicle.

BACKGROUND

An electric railway vehicle is driven using a power supplied from an overhead line through a pantograph. By the way, it would appear that, in typical foreign railway systems, an overhead line is not set up over a yard line of a train shed and a pit line for performing maintenance. In this case, when moving an electric vehicle to a pit line over which an overhead line is not set up, a locomotive with a diesel power not requiring an overhead power moves the electric vehicle to the pit line. In this case, each time the necessity to move the electric vehicle to the pit line occurs, the locomotive with diesel power becomes necessary, and therefore there was a problem that the working efficiency is bad.

Accordingly, a method to drive a main motor at low speed using a battery for control power source which is usually provided in an electric vehicle has been proposed. However, since the voltage of the battery for a control power source is lower compared with a voltage which is usually applied to a DC side of a VVVF inverter for driving the motor, a voltage so as to obtain a prescribed speed, that is a rotational frequency of the motor, will be insufficient.

In such a case, as a configuration so as to boost a voltage of the battery for control power source to a voltage required for a VVVF inverter, technology which is provided with a boosting chopper has been proposed.

DETAILED DESCRIPTION

According to an embodiment, an electric vehicle control apparatus is provided with a converter having a diode and a switching device which convert an AC voltage or a DC voltage supplied from an input side into a DC voltage, whose output side is connected to a main motor through an inverter, a battery connected to the converter through a reactor, to provide a power source for the main motor, and a boosting chopper circuit composed of the diode and the switching device which the converter has, so as to boost a voltage of the battery.

Hereinafter, further embodiments will be described with reference to the drawings.

First Embodiment

Figure 1:
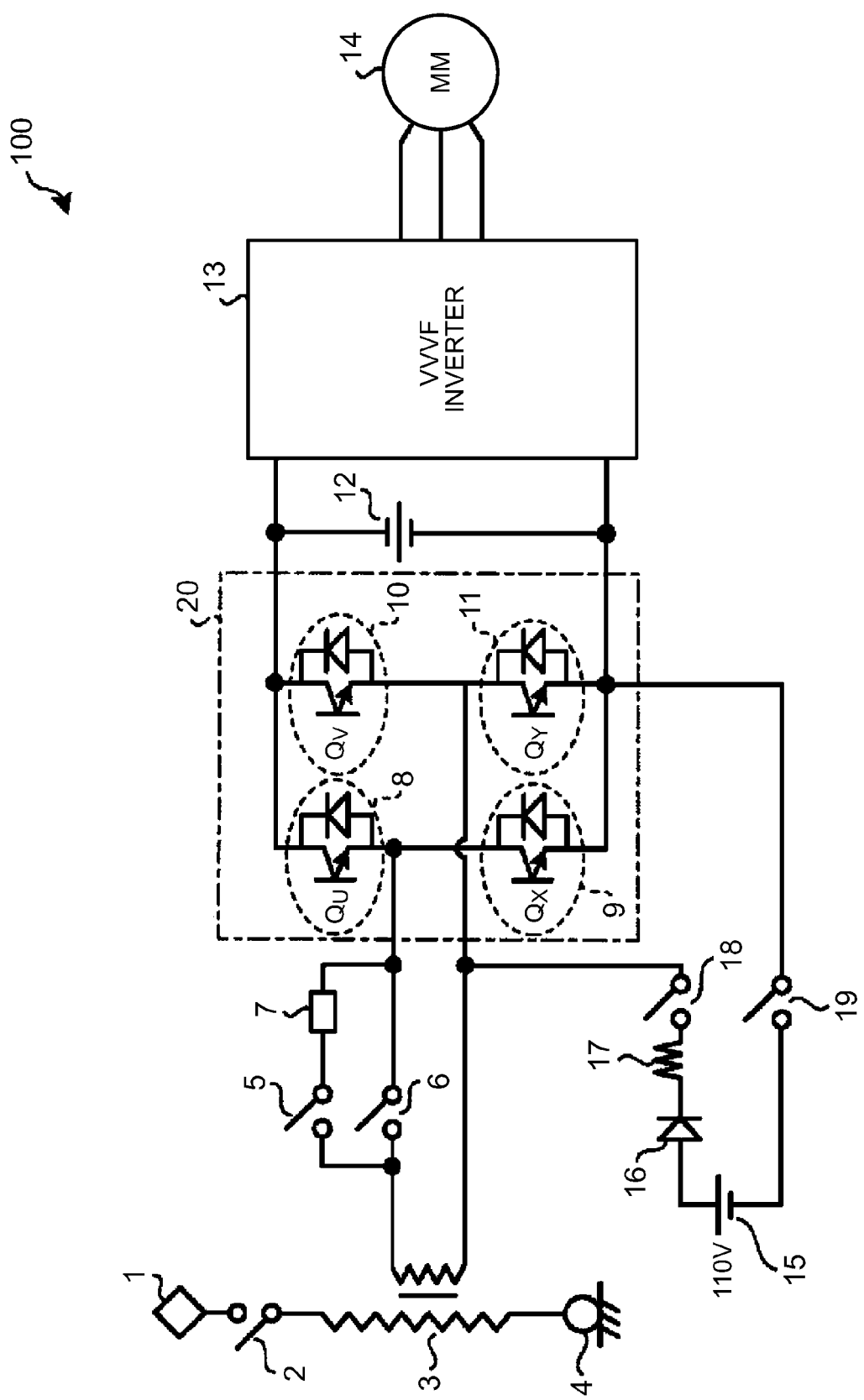
FIG. 1 is a diagram showing a main circuit configuration of an electric vehicle control apparatus of an electric vehicle according to a first embodiment.

FIG. 1 is a diagram showing a main circuit configuration of an electric vehicle control apparatus 100 of an electric vehicle according to an embodiment. As shown in FIG. 1, a power collector (hereinafter, pantograph) 1 is connected to an AC overhead line not shown, and thereby an electric power is supplied to the electric vehicle control apparatus 100. And, the pantograph 1, an AC high-speed circuit breaker 2, and a transformer 3 are connected to the electric vehicle control apparatus 100 at the overhead line side thereof. And, a negative side of the transformer 3 is earthed through a wheel 4. The transformer 3 transforms an AC voltage supplied through the pantograph 1 from the AC overhead line, and supplies the transformed AC voltage to an AC/DC converter 20 side.

As shown in FIG. 1, the electric vehicle control apparatus 100 according to the present embodiment is provided with a contactor 5 for passing electric current through a charging resistor, a contactor 6 for short-circuiting the charging resistor, a charging resistor 7, and the AC/DC converter 20 at the secondary side of the transformer 3. In addition, the electric vehicle control apparatus 100 is provided with a filter capacitor 12, and a VVVF inverter 13 at the DC side of the AC/DC converter 20. Furthermore, the electric vehicle control apparatus 100 is provided with a main motor (MM) 14 such as a traction motor at the AC side of the VVVF inverter 13. In addition, the electric vehicle control apparatus 100 is provided with a battery 15 for control power source, a backflow preventing diode 16, a reactor 17, a positive side opening contactor 18, and a negative side opening contactor 19.

The battery 15 for control power source (hereinafter, referred also to as a battery 15) is a battery to supply electric power to various systems performing control in the electric vehicle control apparatus 100 and so on. The battery 15 for control power source according to the present embodiment is used for supplying electric power to the VVVF inverter 13, when an electric vehicle moves on a place where no overhead line is installed. When a power supplying source such as the overhead line, and a third rail is present, since the battery 15 for control power source is charged by a charger not shown, the battery 15 becomes to a full charge state.

The AC/DC converter 20 according to the present embodiment has two phases of a U-phase and a V-phase. The U-phase includes a U-phase upper side device 8, and a U-phase lower side device 9. The V-phase includes a V-phase upper side device 10, and a V-phase lower side device 11. Each of the U-phase upper side device 8, the U-phase lower side device 9, the V-phase upper side device 10, and the V-phase lower side device 11 is composed of a diode (10a, 11a) and a switching device (10b, 11b) such as an IGBT which are connected in anti-parallel. In the present embodiment, it is illustrated that the V-phase of the AC/DC converter 20 is used to form a boosting chopper circuit for boosting a voltage of the battery 15. However, the U-phase of the AC/DC converter 20 can be used to form the boosting chopper circuit.

In the electric vehicle control apparatus 100 according to the present embodiment, when the electric vehicle runs on a place where an overhead line is installed, the AC high-speed circuit breaker 2, the contactor 5, and the contactor 6 are connected, and the positive side opening contactor 18, and the negative side opening contactor 19 are opened. By this means, the electric power supplied from the transformer 3 is supplied to the AC/DC converter 20 through the charging resistor 7. And, the AC/DC converter 20 converts an AC voltage of the supplied electric power into a DC voltage. And, the electric power is supplied from the AC/DC converter 20 to the filter capacitor 12 and the VVVF inverter 13 which are arranged in parallel. The VVVF inverter 13 converts the DC voltage outputted from the AC/DC converter 20 into an AC voltage of variable voltage variable frequency, and supplies the AC voltage to the main motor 14 to drive the electric vehicle. By this means, the electric vehicle can run on a place where an overhead line is installed. However, in many cases, in foreign railway systems, an overhead line may not be set up over a yard line of a train shed, and a pit line for performing maintenance. In order to run an electric vehicle in a condition like this, the battery 15 is required for driving the main motor.

According to the electric vehicle control apparatus 100 of the present embodiment, the AC/DC converter 20 is connected to the battery 15, and part of the semiconductor devices of the AC/DC converter 20 is utilized for forming the boosting chopper. Namely, the AC/DC converter 20 and the boosting chopper share common semiconductor devices. Hereinafter, an explanation on how the boosting chopper is realized will be provided.

Figure 2:
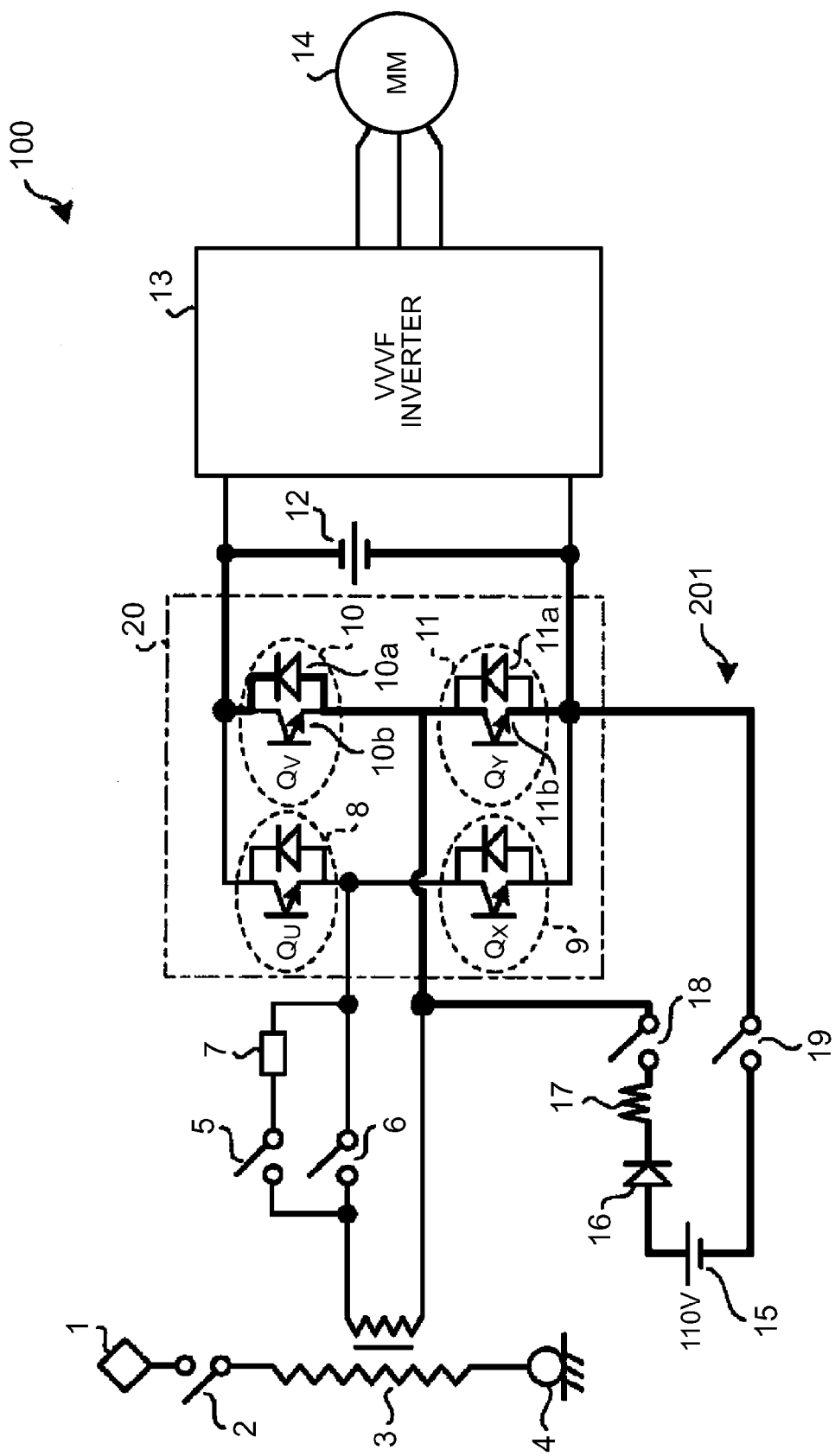
FIG. 2 is a diagram showing a boosting chopper to which a part of the configuration included in the AC/DC converter provided in the electric vehicle control apparatus according to the first embodiment is applied.

FIG. 2 is a diagram showing a boosting chopper to which part of the configuration included in the AC/DC converter 20 provided in the electric vehicle control apparatus 100 is applied. In the example shown in FIG. 2, a boosting chopper circuit 201 is realized by the configuration on the route shown by bold lines. That is, the boosting chopper circuit 201 is composed of the battery 15, the backflow preventing diode 16, the reactor 17, the switching device (IGBT or the like, for example) 11b included in the V-phase lower side device 11, the diode 10a included in the V-phase upper side device 10, and the filter capacitor 12. As shown in FIG. 2, the boosting chopper circuit 201 shares the switching device 11b, and the diode 10a included in the V-phase upper side device 10 with the AC/DC converter 20.

The reactor 17 used in the boosting chopper circuit 201 is determined by a battery discharge current and a switching frequency. For example, if the running by the battery 15 is limited to the running at a speed of about 3 km/h, and also the driving force is limited to about ⅕ of the maximum driving force, the power consumption becomes about 30 kw. And if the voltage of the battery 15 is 110 V, and when the battery discharge current is 270 A, the switching frequency is 500 Hz, and if allowable current pulsation is ±50 A, that is, peak to peak thereof is 100 A, the inductance value may be about 1 mH. For this reason, in the present embodiment, the reactor 17 with an inductance value of 1 mH and a rated current of 270 A may be selected. Accordingly, the additional component does not become such a large component as to affect the size of the whole electric vehicle control apparatus 100.

The backflow preventing diode 16 is provided for preventing the battery 15 from being charged by backflow of the current.

When the electric vehicle according to the present embodiment moves on a place where an overhead line is installed, an operator performs an operation to switch to the battery running, and thereby the pantograph 1 comes down, and a circuit is established so that electric power is supplied from the battery 15 to the VVVF inverter 13.

When the electric vehicle according to the present embodiment runs on a place where no overhead line by using the electric power of the battery 15, the electric vehicle control apparatus 100 makes the AC high-speed circuit breaker 2, the contactor 5 for inputting the charging resistor and the contactor 6 for short-circuiting the charging resistor to be opened, and connects the positive side opening contactor 18, and the negative side opening contactor 19. And, the boosting chopper circuit 201 performs boosting in accordance with the conduction ratio of the switching device 11b.

By this means, the electric vehicle control apparatus 100 according to the present embodiment, even if the voltage of the battery 15 is 110 V, for example, after the boosting chopper circuit 201 boosts the voltage to a voltage of 200-300 V, can charge the filter capacitor 12. Since the electric power is supplied to the VVVF inverter 13 with the boosted voltage, it is possible to drive the main motor 14. By this means, the electric vehicle control apparatus 100 can move the electric vehicle on which the electric vehicle control apparatus 100 is loaded can move at a place where no overhead line is installed.

Figure 3:
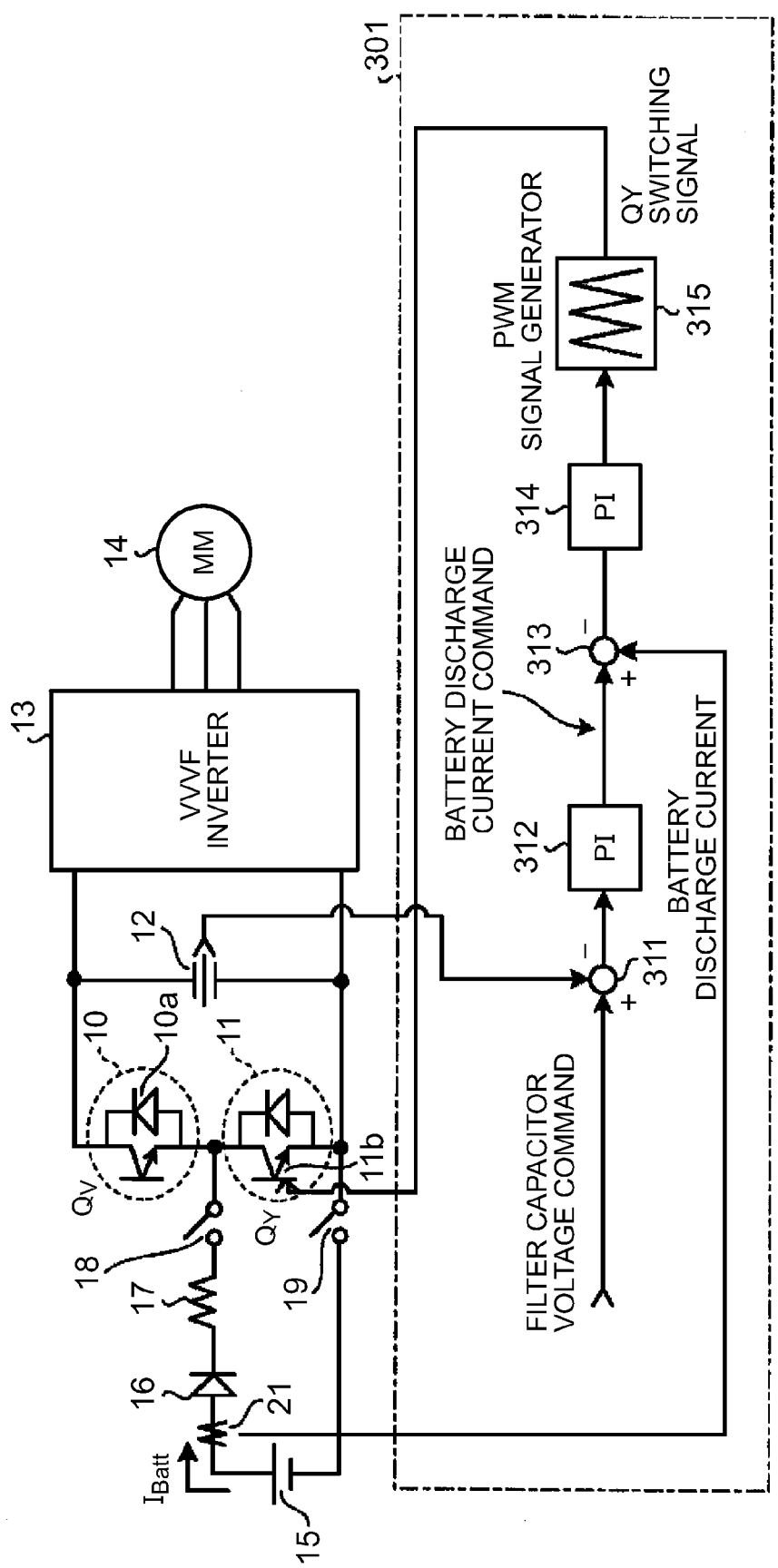
FIG. 3 is a diagram showing a main circuit configuration to control the boosting chopper in the electric vehicle control apparatus according to the first embodiment.

FIG. 3 is a diagram showing a main circuit configuration to control the boosting chopper circuit 201 in the electric vehicle control apparatus 100. The main circuit configuration shown in FIG. 3 is provided with a switch control unit 301, and operates by the energization from the battery 15. In addition the configuration shown in FIG. 3 is shown as an example of a control system to control the boosting chopper circuit 201, and other control system may be used.

The switch control unit 301 shown in FIG. 3 turns on/off the switching device 11b included in the V-phase lower side device 11, and thereby a discharge current $I_{BATT}$ from the battery 15 flows. That is, when the switch control unit 301 turns on the switching device 11b included in the V-phase lower side device 11, since the battery is short-circuited through the reactor 17, the current increases. Then, when the switch control unit 301 turns off the switching device 11b, the current passes through the diode 10a side of the V-phase upper side device 10 into the filter capacitor 12, by the energy stored in the reactor 17. At this time, the discharge current $I_{BATT}$ gradually decreases. When the switch control unit 301 again turns on the switching device 11b included in the V-phase lower side device 11, the discharge current $I_{BATT}$ re-increases.

In the electric vehicle control apparatus 100 according to the present embodiment, this operation is repeated, and thereby the current from the battery 15 is charged into the filter capacitor 12. In this manner, the switch control unit 301 adequately changes the ON/OFF cycle, that is the conduction ratio, of the switching device 11b of the V-phase lower side device 11, and consequently the voltage of the filter capacitor 12 becomes higher than the voltage of the battery 15.

Next, the configuration of the switch control unit 301 will be described with reference to FIG. 3. In the present embodiment, a filter capacitor voltage required for driving the main motor 14 is predetermined as a command value (referred to also as a filter capacitor voltage command value). When a voltage applied to the filter capacitor 12 is to be made 300 V, 300 V is set as the filter capacitor voltage command value.

And, a subtractor 311 outputs a difference voltage value which is obtained by subtracting a voltage measured from the filter capacitor 12, from the filter capacitor voltage command value, to a proportional integral controller (PI) 312. And the proportional integral controller 312 calculates a command value (a battery discharge current command value) for determining a discharge current flowing from the battery 15, from the inputted difference voltage value.

And, a subtractor 313 outputs a difference current value which is obtained by subtracting an actual battery discharge current value from the battery discharge current command value, to a proportional integral controller (PI) 314. The proportional integral controller 314 calculates a conduction ratio (a ratio of a time when the switching device 11b is ON) of the switching device 11b of the boosting chopper circuit 201 from the inputted difference current value.

And a PWM signal generator 315 generates a switching signal $Q_Y$ for the switching device 11b, with a method such as to compare a conduction ratio and a triangular wave, so that the switching frequency becomes a prescribed switching frequency.

Figure 4:
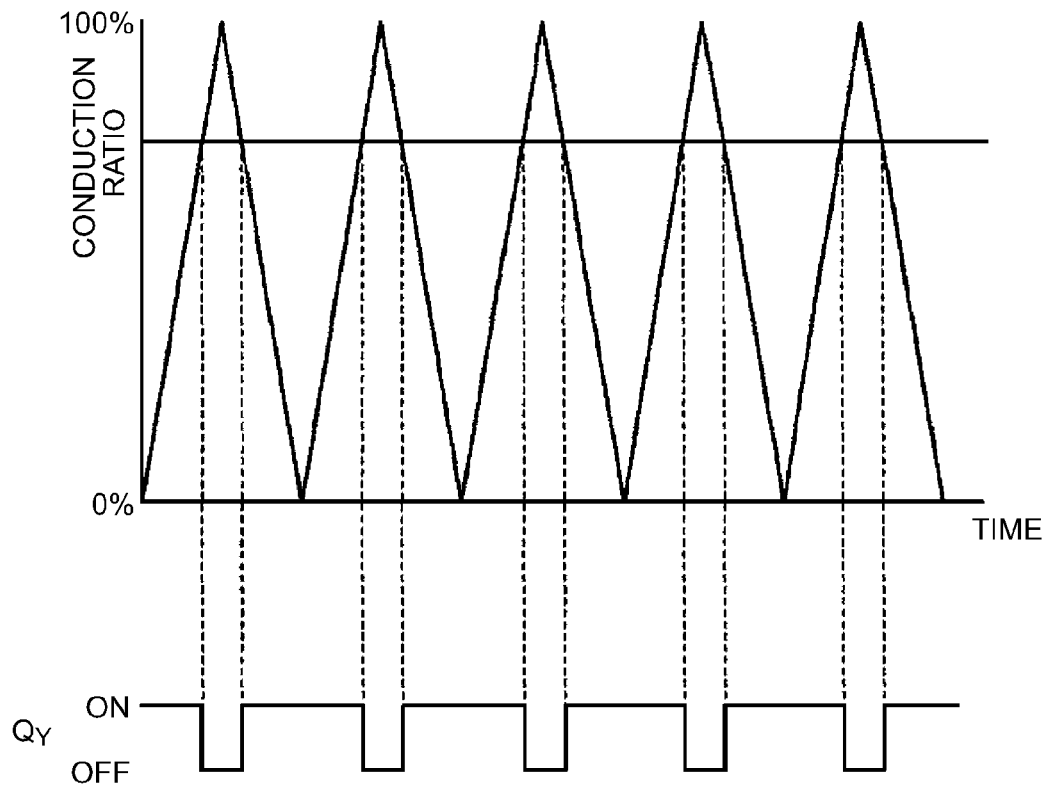
FIG. 4 is a diagram showing an example of a switching signal $Q_Y$ which is generated in accordance with the relation between the voltage command value and the triangular wave.

FIG. 4 is a diagram showing an example of the switching signal $Q_Y$ which is generated according to the relation between the voltage command value and the triangular wave. As shown in FIG. 4, the PWM signal generator 315 compares the conduction ratio with the triangular wave, and in a case where the conduction ratio is larger than the triangular wave, the PWM signal generator 315 outputs the switching signal $Q_Y$ as ON. On the other hand, in a case where the conduction ratio is not more than the triangular wave, the PWM signal generator 315 outputs the switching signal $Q_Y$ as OFF. By this means, the ON/OFF cycle of the switching device 11b is controlled in accordance with the switching signal $Q_Y$.

Figure 5:
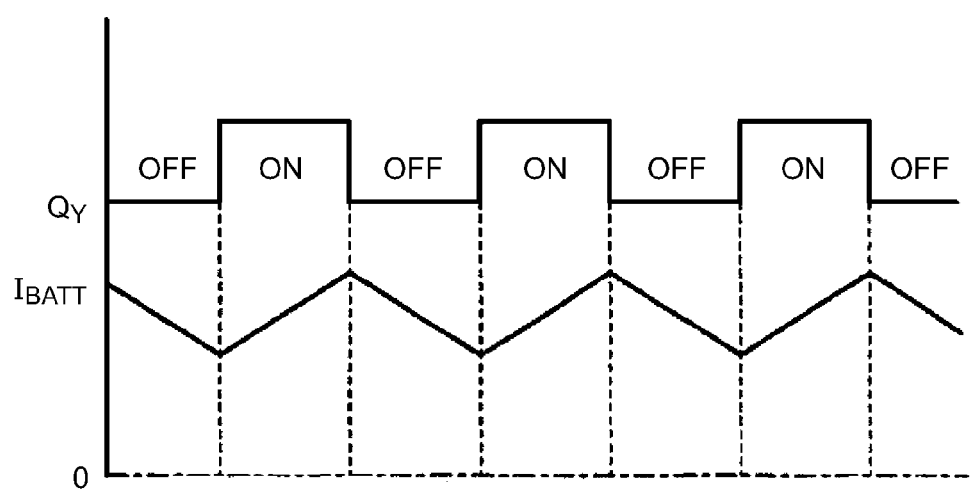
FIG. 5 is a diagram showing an example of a discharge signal $I_{BATT}$ which increases and decreases in accordance with an ON/OFF cycle of the switching signal $Q_Y$.

FIG. 5 is a diagram showing the discharge current $I_{BATT}$ which increases and decreases in accordance with the ON/OFF cycle of the switching signal $Q_Y$. As shown in FIG. 5, the discharge current $I_{BATT}$ gradually increases during a time period when the switching signal $Q_Y$ is ON, and the discharge current $I_{BATT}$ gradually decreases during a time period when the switching signal $Q_Y$ is OFF.

Figure 6:
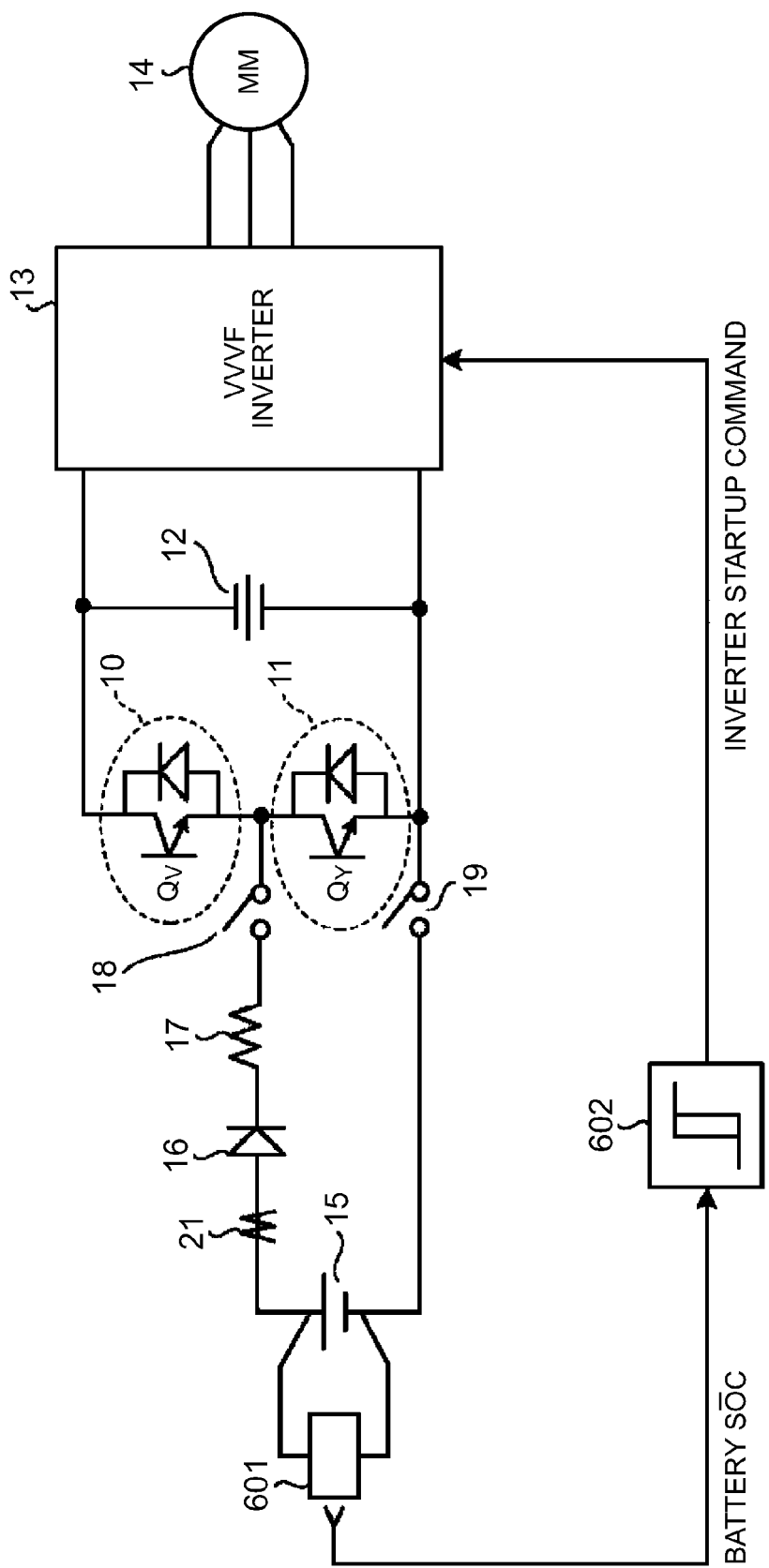
FIG. 6 is a diagram showing a configuration to control the VVVF inverter of the electric vehicle control apparatus according to the first embodiment.

In addition, the electric vehicle control apparatus 100 according to the present embodiment is provided with a configuration to control the inverter 13 in accordance with the voltage of the battery 15. FIG. 6 is a diagram showing a configuration to control the VVVF inverter 13 of the electric vehicle control apparatus 100. As shown in FIG. 6, the electric vehicle control apparatus 100 is provided with a battery SOC (State of Charge: charging state of a battery) detection unit 601, and a battery SOC determination unit 602.

As shown in FIG. 6, the battery SOC detection unit 601 detects the SOC (charging state of the battery) of the battery 15, and outputs the detection result to the SOC determination unit 602. And, the battery SOC determination unit 602 has a function to output a startup command to the VVVF inverter 13, based on the detection result. In this manner, in the present embodiment, when determining that the SOC of the battery 15 is not less than a predetermined value, the battery SOC determination unit 602 outputs the startup command to the VVVF inverter 13, to make the driving main motor 14 to be driven.

As described above, it becomes possible to make the voltage of the filter capacitor 12 higher than the voltage of battery 15. By this means, it becomes possible that the VVVF inverter 13 applies a sufficient voltage to the main motor 14.

In addition, when the battery SOC determination unit 602 determines that the SOC of the battery 15 is smaller than a predetermined value, since the power supply from the battery 15 is suppressed, the over discharge can be suppressed. By this means, it is possible to suppress that the battery 15 deteriorates.

Incidentally, FIG. 2 shows the exemplary configuration in which the diode 10a of the V-phase upper side device 10 and the switching device 11b of the V-phase lower side device 11 are made to perform chopper operation, to boost the voltage. However, if the chopper operation as in the present embodiment is not carried out, and a switching signal to control the switching device 11b is kept in the OFF state, the discharge current from the battery 15 flows into the diode 10a of the V-phase upper side device 10. By this means, the same voltage as the battery 15 is applied to the filter capacitor 12. When the sufficient driving force is obtained even by this voltage of the battery 15, the main motor 14 may be driven from the VVVF inverter 13 without boosting. Even in such a case, the reactor 17 functions as a smoothing circuit for the discharge current from the battery 15. By this means, the ripple (vibration component) of the discharge current from the battery 15 can be decreased, and the heat generation from the battery 15 can be suppressed, and thereby it is possible to prevent that the life of the battery is made to be shortened.

In the electric vehicle control apparatus 100 according to the present embodiment, the example has been described in which, in order to perform driving by the battery 15 for control power source, the battery 15 is connected to one phase of the AC/DC converter 20, that is the V-phase in the example shown in FIG. 1, through the reactor 17 and the backflow preventing diode 16, and through the positive side opening contactor 18 and the negative side opening contactor 19. In this manner, in the present embodiment, the case in which a main circuit line from the battery 15 for control power source is connected to the V-phase has been shown, but a configuration in which the main circuit line is connected to the U-phase may be used. Furthermore, in the present embodiment, the example has been described in which the electric vehicle control apparatus 100 according to present embodiment is provided with the converter to convert the AC voltage into the DC voltage, but an example provided with a converter to convert a DC voltage supplied from an input side into a DC voltage may be used.

In the electric vehicle control apparatus 100 according to the present embodiment, the voltage is boosted using part of the configuration of the AC/DC converter 20 configured as a main circuit for an AC overhead line as a boosting chopper, and thereby it has become possible to apply the voltage higher than the voltage of the battery 15 to the VVVF inverter 13. By this means, it has become possible that the VVVF inverter 13 applies the sufficient voltage to the main motor 14.

That is to say, in the electric vehicle control apparatus 100 of the present embodiment, since boosting function has been ensured without providing semiconductor devices for a boosting chopper, it becomes possible to achieve miniaturization of the whole electric vehicle control apparatus.

In other words, in the electric vehicle control apparatus of the present embodiment, since the boosting chopper is realized using part the configuration of the converter, at the time of driving the main motor by the battery, although the voltage supplied to the main motor is boosted, resulting in that the electric vehicle control apparatus is not provided with the boosting chopper.

Second Embodiment

The example to use part of the configuration of the AC/DC converter as the boosting chopper is not limited to the first embodiment, but other aspect may be applied. Accordingly, in a second embodiment, a case in which a main circuit configuration is another aspect will be described.

Figure 7:
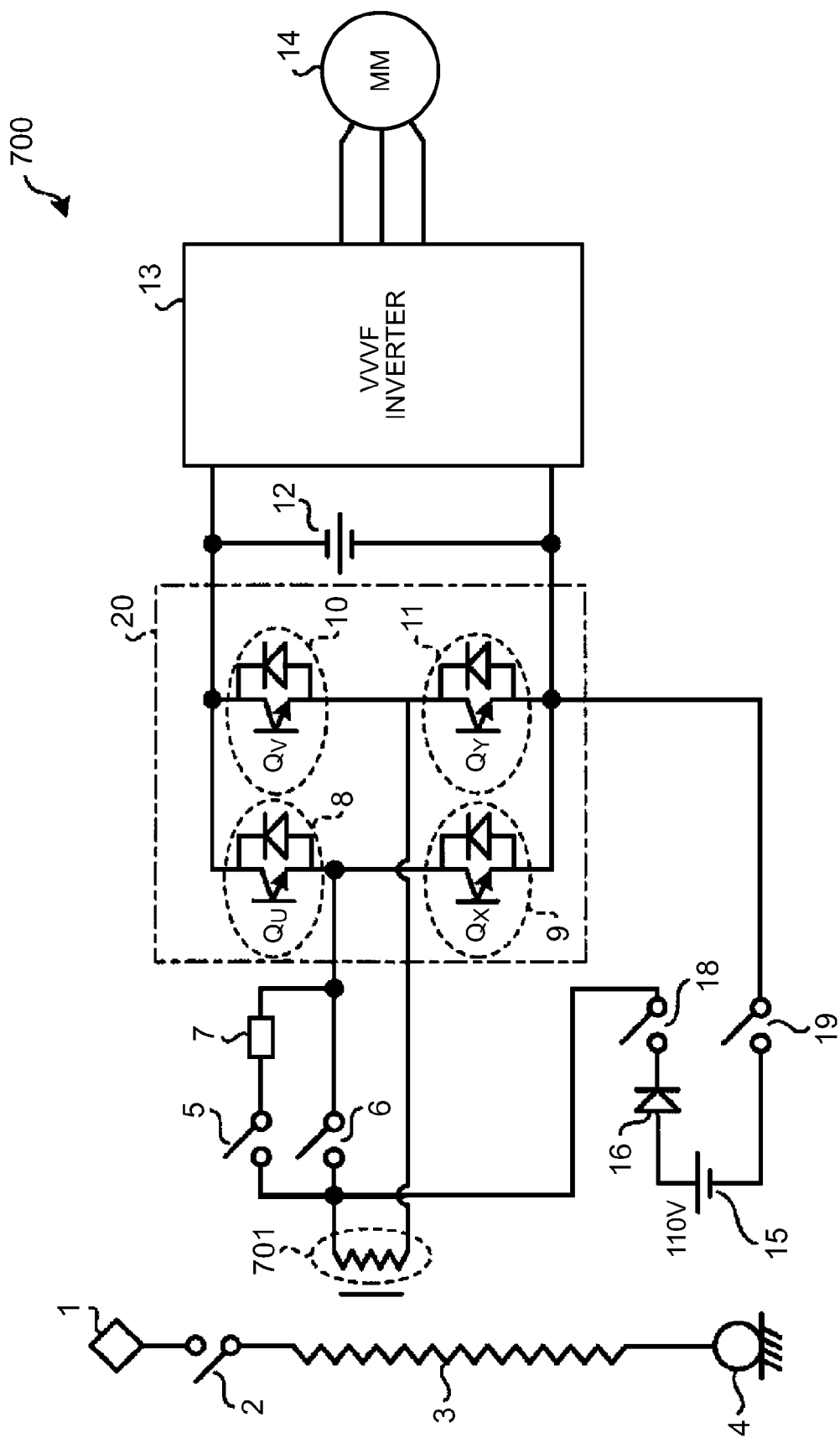
FIG. 7 is a diagram showing a main circuit configuration of an electric vehicle control apparatus according to a second embodiment.

FIG. 7 is a diagram showing a main circuit configuration of an electric vehicle control apparatus 700 according to a second embodiment. Furthermore, in the second embodiment, the same symbols are given to the same constituent elements as the above-described first embodiment, and the description thereof will be omitted.

The electric vehicle control apparatus 700 shown in FIG. 7 is an example in which, compared with the electric vehicle control apparatus 100 of the first embodiment, the reactor 17 is removed, and a secondary winding 701 of the transformer 3 is used in place of the reactor 17.

Figure 8:
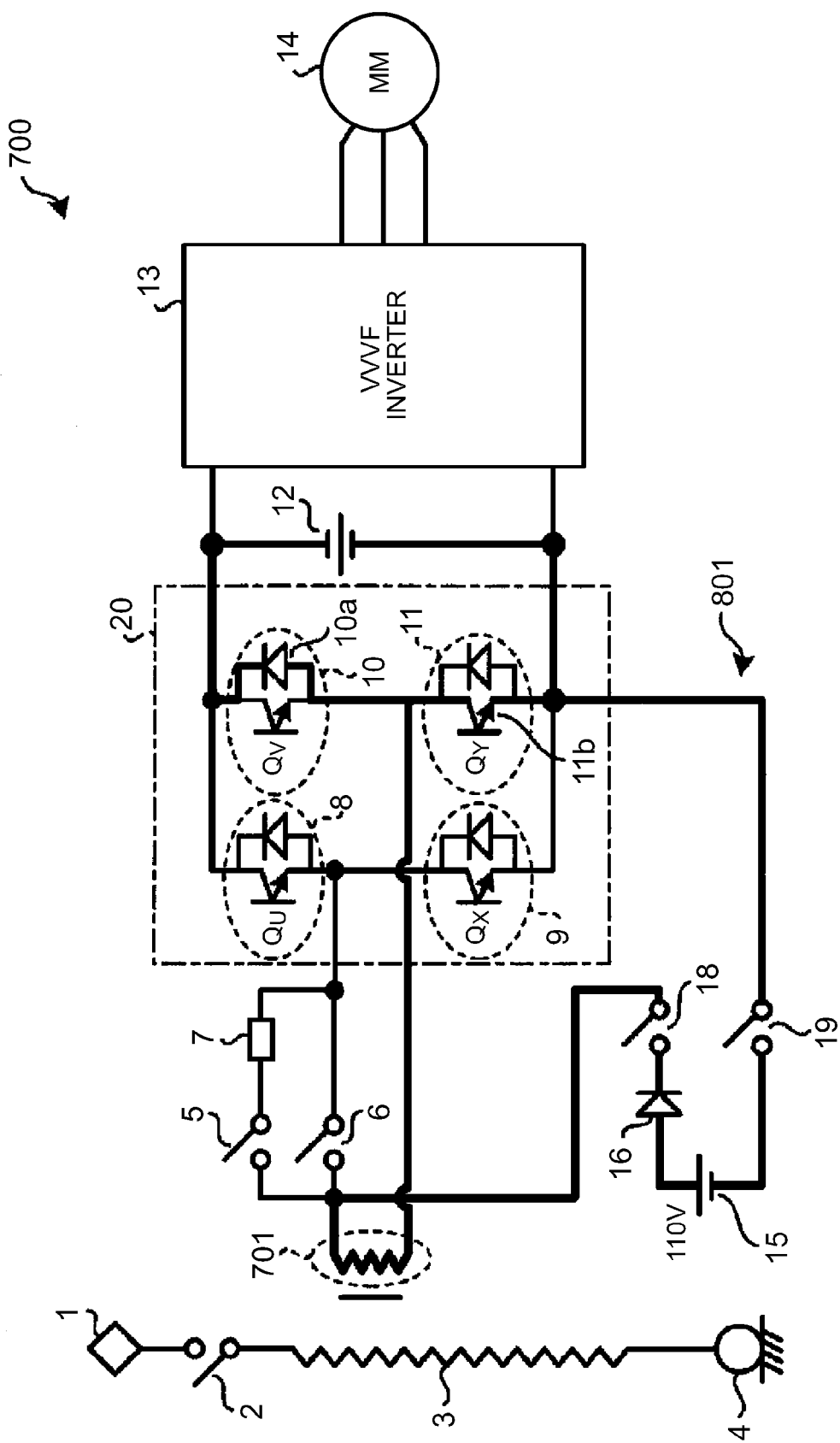
FIG. 8 is a diagram showing a boosting chopper to which a part of the configuration included in the AC/DC converter provided in the electric vehicle control apparatus according to the second embodiment is applied.

FIG. 8 is a diagram showing a boosting chopper to which part of the configuration included in the AC/DC converter 20 provided in the electric vehicle control apparatus 700 is applied. In the example shown in FIG. 8, a boosting chopper 801 is realized by the configuration on the route shown by bold lines. That is, the boosting chopper 801 is composed of the battery 15, the backflow preventing diode 16, the secondary winding 701 of the transformer 3, the switching device (a transistor, for example) 11b included in the V-phase lower side device 11, the diode 10a included in the V-phase upper side device 10, and the filter capacitor 12.

As shown in FIG. 8, the boosting chopper 801 shares the switching device 11b and the diode 10a included in the V-phase upper side device 10 with the AC/DC converter 20, and in addition uses the secondary winding 701 of the transformer 3 as a reactor.

Generally, an inductance of a secondary winding of a transformer is about 1 mH to 2 mH. For this reason, the secondary winding 701 of the transformer 3 can be used as an inductance sufficient for a reactor for a boosting chopper.

In this manner, the electric vehicle control apparatus 700 according to the present embodiment shares part of the devices included in the AC/DC converter 20, similarly as the first embodiment, and in addition uses the secondary winding 701 of the transformer 3 as a reactor, and boosts the voltage of the battery 15 to apply the boosted voltage to the VVVF inverter 13, to thereby make the main motor 14 to be driven. Furthermore, the control and so on at the time of driving are the same as in the first embodiment, and the description thereof will be omitted.

In this manner, in the electric vehicle control apparatus 700 according to the present embodiment, a new reactor is suppressed from being provided, and thereby further reduction of the number of components is made possible. By this means, it is possible to suppress cost increase.

Furthermore, the electric vehicle control apparatus 700 according to the present embodiment uses the secondary winding 701 of the transformer 3 as a reactor, and thereby realizes smoothing of the discharge current similarly as the first embodiment.

The above-described electric vehicle control apparatuses according to the first to second embodiments have used part of the configuration of the AC/DC converter to convert the AC overhead line voltage to the DC voltage in an electric vehicle of an AC overhead line, as the boosting chopper.

By this means, in the electric vehicle control apparatuses according to the first to second embodiments, it has become possible to solve the problem that, conventionally in the case of trying to drive a vehicle by a battery for control power source, since the battery voltage is low, if the battery voltage is directly connected to a DC side of a driving VVVF inverter, since the voltage is insufficient for a voltage for driving the main motor, the sufficient speed and driving force cannot be obtained.

Furthermore, conventionally, there was a problem that when using the voltage of a battery, the voltage is applied to a VVVF inverter, a discharge current from the battery includes ripple (vibration component) caused by the switching of the VVVF inverter, and the battery generates heat, and thereby the life of the battery is caused to be shortened. Whereas, according to the electric vehicle control apparatuses of the first to second embodiments, since the reactor 17 or the secondary winding 701 of the transformer 3 is placed between the battery 15 and the VVVF inverter 13, the discharge current can be smoothed, and therefore generation of heat in the battery 15 can be prevented.

The electric vehicle control apparatus of the configuration described above shares the semiconductor devices and the reactor composing the boosting chopper, with the converter and the main transformer provided in the main circuit. Thus, in addition to the effect of the first embodiment, the number of components necessary for the electric vehicle control apparatus having boosting function can be reduced and miniaturization can be realized. In addition, since the number of the components can be reduced, cost reduction can be made. Furthermore, since it is unnecessary to ensure a space to install the boosting chopper, it becomes possible to provide flexibility in the arrangement of other components.

Third Embodiment

Figure 9:
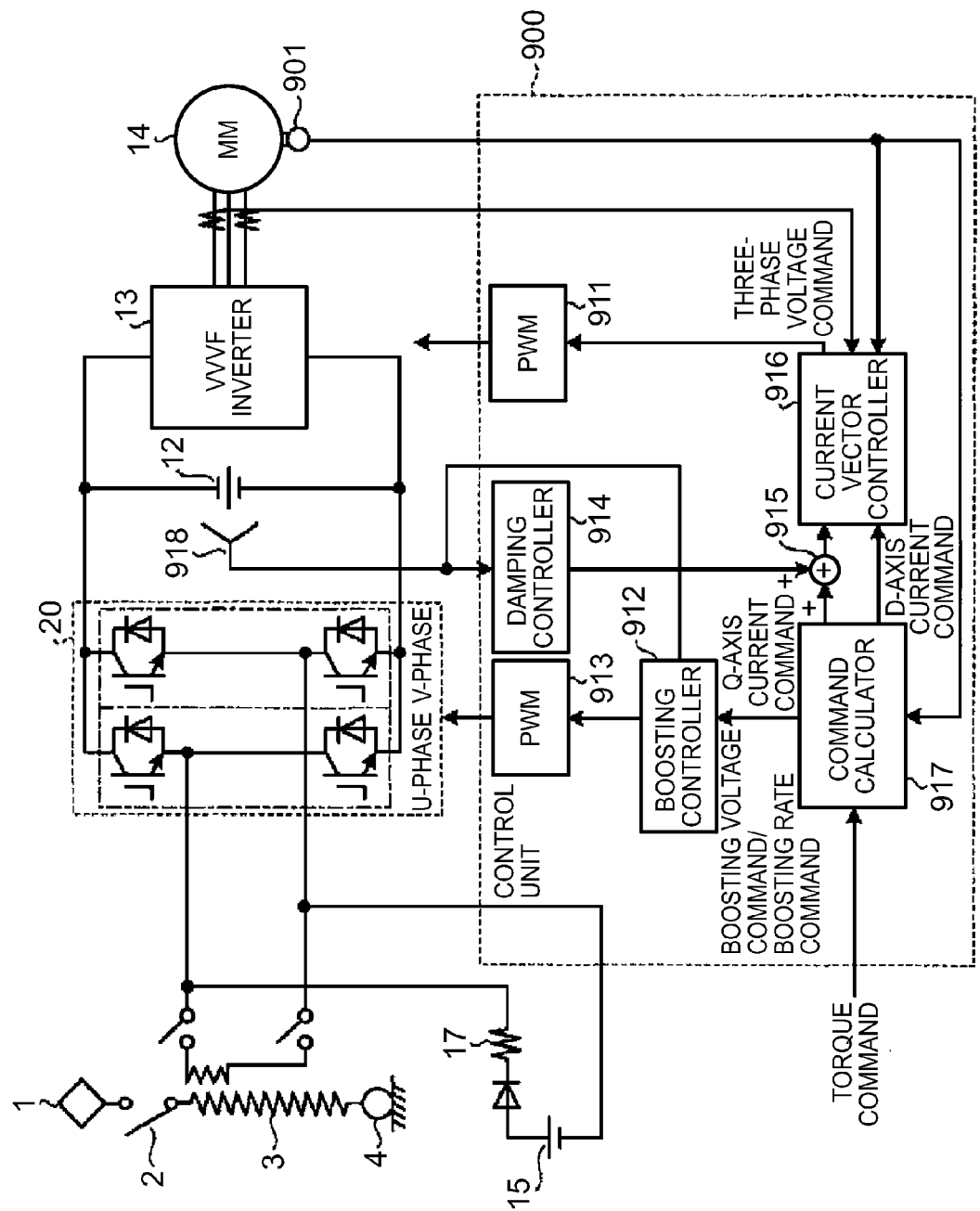
FIG. 9 is a diagram showing a main circuit configuration of an electric vehicle control apparatus according to a third embodiment.

FIG. 9 is a diagram showing a main circuit configuration of the electric vehicle control apparatus 700 according to a third embodiment. Furthermore, in the third embodiment, the same symbols are given to the same constituent elements as the above-described first embodiment, and the description thereof will be omitted.

The electric vehicle control apparatus 700 according to the third embodiment connects the battery 15 of a low voltage through the reactor 17 between the U-phase and the V-phase of the AC/DC converter (single-phase PWM converter) 20.

The filter capacitor (smoothing capacitor) 12, the VVVF inverter 13, and the main motor 14 are connected to the DC side of the AC/DC converter (single-phase PWM converter) 20.

And, in the electric vehicle control apparatus 700 according to the present embodiment, a rotation detector 901 to detect the rotational frequency of the main motor 14 is mounted to the main motor 14. And, the present embodiment is an example in which a control unit 900 performs control in accordance with the rotation of the main motor 14 detected by the rotation detector 901.

The control unit 900 according to the present embodiment is provided with a PWM controller 911, a boosting controller 912, a PWM controller 913, a damping controller 914, an adder 915, a current/vector controller 916, and a command calculator 917.

And, a torque command calculated based on a command from an operator's cab, and the rotational frequency of the main motor 14 are inputted to the command calculator 917 of the control unit 900. The command calculator 917 calculates and outputs a D-axis current command, a Q-axis current command, and a boosting voltage command, based on the torque command and the rotational frequency. Next, a D-axis current and a Q-axis current will be described.

Figure 10:
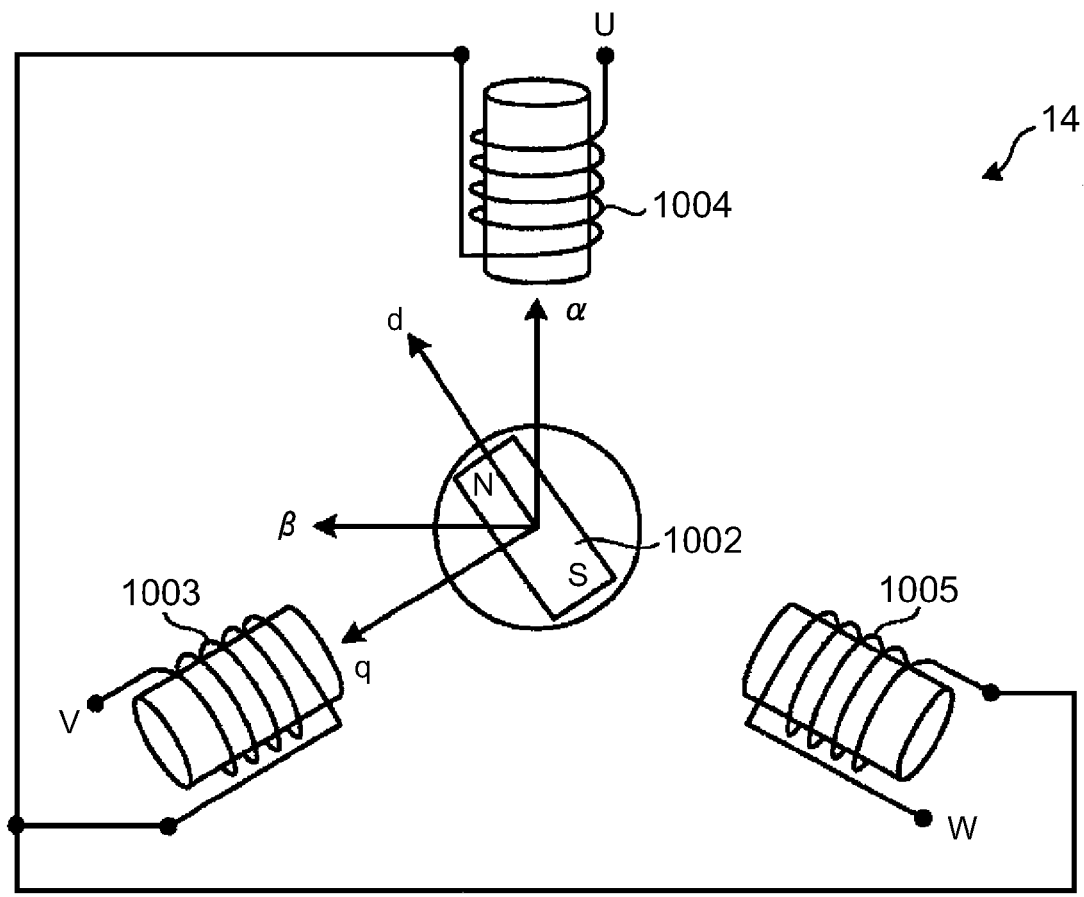
FIG. 10 is a diagram showing an example of the driving main motor which is driven by the power supplied from the VVVF inverter.

FIG. 10 is a diagram showing an example of the main motor 14 which is driven by the electric power supplied from the VVVF inverter 13. As shown in FIG. 10, the main motor 14 is provided with electric circuits (field coils) corresponding to three phases of a V-phase 1003, a U-phase 1004, and a W-phase 1005. The main motor 14 rotates a shaft 1002 by the rotating field generated by flowing currents to the field coils of the respective phases.

And, the present embodiment is an example in which three phases (U, V, W) are converted into an αβ-axis coordinate system at rest of orthogonal two phases, and then further converted into a DQ-axis rotating coordinate system, to perform control of the main motor 14. In addition, since the conversion method of these coordinate systems is well-known technology, the description thereof will be omitted.

And, in the DQ-axis rotating coordinate system, when the D-axis is set to the direction of the secondary magnetic flux of the main motor 14, the D-axis becomes an excitation component, and the Q-axis becomes a torque component. That is, a D-axis current becomes an excitation current component, and a Q-axis current becomes a torque current component. And, the command calculator 917 outputs the D-axis current command, and the Q-axis current command, based on the DQ-axis rotating coordinate system.

Returning to FIG. 9, the damping controller 914 performs pseudo differentiation of the voltage of the filter capacitor (smoothing capacitor) 12 detected by a voltage detector 918, and multiplies the result of the psude differentiation by a gain, to calculate a compensation amount to the Q-axis current command. And the adder 915 adds the compensation amount to the Q-axis current command outputted from the damping controller 914 to the Q-axis current command value outputted from the command calculator 917, to output the Q-axis current command after compensation.

The Q-axis current command after compensation and the D-axis current command are inputted to the current/vector controller 916. And, the current/vector controller 916 outputs a three-phase voltage command to the PWM controller 911. And, the PWM controller 911 controls the switching devices incorporated in the VVVF inverter 13, based on the inputted three-phase voltage command.

In addition, the command calculator 917 outputs a boosting voltage command to the boosting controller 912. The boosting controller 912 outputs a conduction ratio command of the AC/DC converter (single-phase PWM converter) 20 to the PWM controller 913, by means of PI control and so on so that the voltage of the smoothing capacitor 12 coincides with the boosting voltage command. Also in the electric vehicle control apparatus according to the present embodiment, the boosting chopper is realized using part of the configuration of the AC/DC converter 20.

The PWM controller 913 switches the devices included in the U-phase in accordance with the inputted conduction ratio command, and on the other hand, keeps the lower device included in the V-phase ON.

Furthermore, the boosting voltage command may become equal to the voltage of the smoothing capacitor. In this case, a boosting rate command indicates a boosting rate of 100%, and the conduction ratio command becomes a conduction ratio of 100%. And, the PWM controller 913 keeps the upper device included in the U-phase ON, and keeps the lower device included in the V-phase ON.

Furthermore, in the present embodiment, the example using the boosting voltage command has been described, but the boosting rate command may be used in place of the boosting voltage command. Even in the case to control the boosting rate using the boosting rate command, the same operation and effect can be obtained as in the case to use the boosting voltage command.

Furthermore, the boosting rate is expressed by a ratio of the DC voltage of the AC/DC converter 20 at the VVVF inverter 13 side, to the DC voltage of the AC/DC converter (single-phase PWM converter) 20 at the battery side 15. For example, when the boosting rate is 100%, the conduction ratio becomes 100% (the upper device included in the U-phase is kept ON), and when the boosting rate is 200%, the conduction ratio becomes 50% (the upper device and the lower device of the U-phase are switched with a duty of 50%).

The damping controller 914 performs pseudo differentiation of the voltage of the smoothing capacitor 12 detected by the voltage detector 918, and multiplies the result of the psude differentiation by the gain, to calculate the compensation amount to the Q-axis current command. And, when the DC voltage rises, the Q-axis current command increases, that is, increasing the torque to thereby increase the current flowing from the smoothing capacitor 12 achieves the same operation and effect as providing a resistor in parallel with the smoothing capacitor 12. Since the energy is consumed by the operation that the resistor is connected in parallel with the smoothing capacitor 12, the resonance can be suppressed.

When controlling the AC/DC converter (single-phase PWM converter) 20, as described above, the boosting controller 912 in the control unit 900, in response to a boosting rate of 100% designated in the boosting rate command, controls both of the upper device included in the U-phase and the lower device included in the V-phase to be kept ON. In this case, the damping controller 914 behaves the same operation as the resistor connected in parallel with the smoothing capacitor 12, and consequently suppresses the resonance generated between the smoothing capacitor 12 and the reactor 17. Meanwhile, since switching of all devices in the AD/DC converter (single-phase PWM converter) 20 is halted and the voltage applied to the VVVF inverter 13 is reduced when a boosting rate of 100% is set to the boosting rate command, the switching loss of the AC/DC converter (single-phase PWM converter) 20 and the VVVF inverter 13 can be reduced, and the current of the battery 15 can be reduced.

The command calculator 917 determines the D-axis current command, the Q-axis current command, the boosting voltage command based on the torque command and the rotational frequency of the main motor 14, so as to reduce the total loss composed of a motor loss and a power conversion loss. For this reason, the electric vehicle control apparatus according to the present embodiment can reduce the generation of heat of the low voltage battery 15, and therefore can suppress the deterioration of the life. In addition, since the high efficiency thereof improves, it becomes possible to make the electric vehicle run a long distance within the limited battery capacity.

Figure 11:
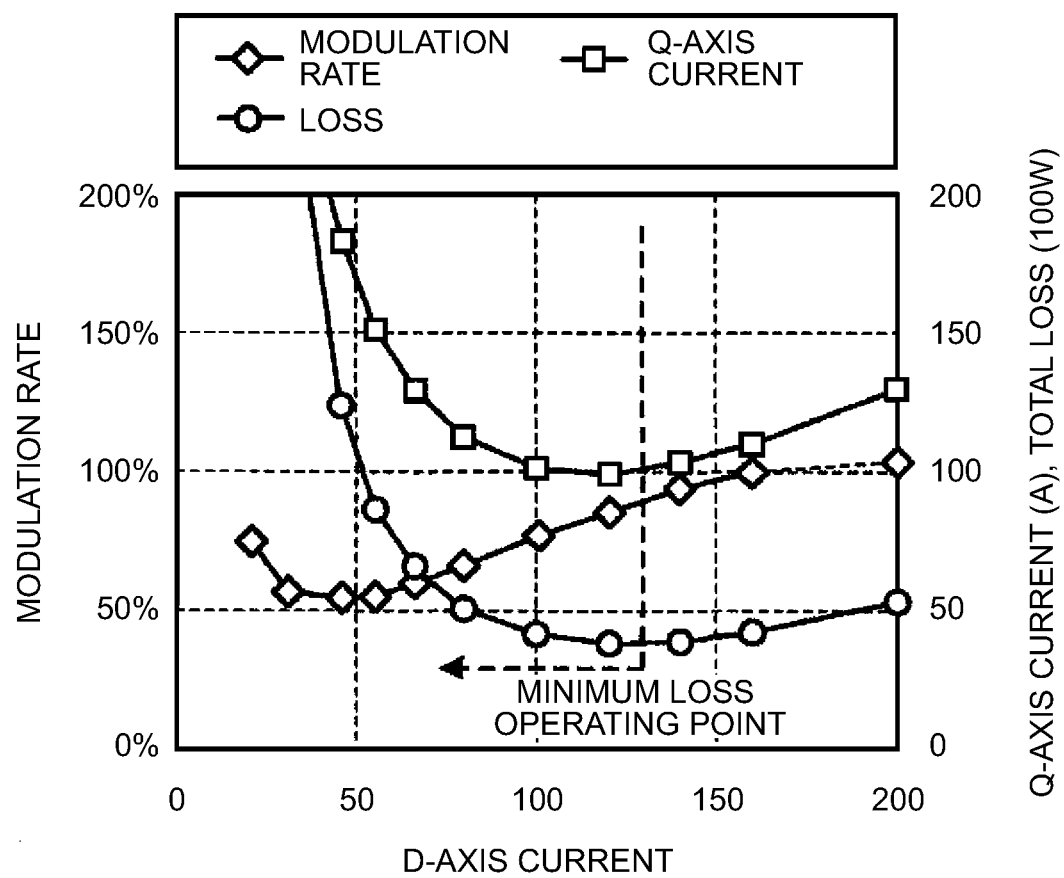
FIG. 11 is a diagram showing the relation between the D-axis current and the Q-axis current for generating a constant torque, and a loss.

FIG. 11 is a diagram showing the relation between the D-axis current and the Q-axis current required for outputting the same torque, and a copper loss of the motor that is a heating loss generated with the operation of the motor, when the rotational frequency and the DC voltage inputted to the VVVF inverter 13 are previously determined. In the case of rotating at extremely low speed, the motor efficiency is low compared with the power conversion efficiency, and the copper loss is dominant in the motor loss. As shown in FIG. 11, in order to make the motor copper loss minimum, it is only necessary to set the D-axis current to about 130 A. In this case, since a modulation rate is about 90%, VVVF inverter 13 can be controlled to output the necessary torque.

Furthermore, when the DC voltage inputted to the VVVF inverter 13 further drops more than the DC voltage determined in FIG. 11, since the modulation rate increases in inverse proportion to the DC voltage, it is supposed that the modulation rate exceeds 100%. If the modulation rate exceeds 100%, the control cannot be performed. In case that the DC voltage drops and the modulation rate exceeds 100%, the command calculator 917 outputs the D-axis current command so as to reduce the D-axis current, as shown in an arrow in FIG. 11. As the D-axis current decreases in accordance with the D-axis current command, the modulation rate decreases. Thus, even in case that the DC voltage drops and the modulation rate exceeds 100%, it is possible to adjust the modulation rate to a value lower than 100%. That is, it is possible to suppress the modulation rate from exceeding 100%, with the change of the DC voltage.

Above embodiment focuses on the case where the DC current becomes low level. However, an embodiment regarding a case where the Q-axis current command is further large as shown in FIG. 11 will be described hereinafter. As shown in FIG. 11, the modulation rate might exceed 100%, under the condition that the Q-axis current command is large in order to output a high torque, and the loss is small. In this case, the command calculator 917 outputs the D-axis current command so as to reduce the D-axis current. Consequently, the modulation rate can be suppressed within 100%, while enabling a high torque output.

The command calculator 917 performs control so that the necessary torque is outputted, in terms of minimizing the loss, by the D-axis current command, and the modulation rate does not exceed 100%.

The control unit 900 according to the present embodiment performs various commands so that the electric vehicle can run with low loss within the range that the modulation rate does not to exceed 100%, for the torque command in each rotation, as described above. For example, theoretically, the modulation rate can optionally be changed by the boosting control of the boosting chopper (the single-phase PWM converter 20 in the present embodiment), but actually, when the boosting rate is increased, a voltage and a current of any portion increase, and receive restriction of a protection voltage and a protection current, and in addition, the boosting has become a factor to increase the loss of the single-phase PWM converter 20 and the VVVF inverter 13.

Accordingly, the command calculator 917 according to the present embodiment has determined the D-axis current command, the Q-axis current command, the boosting voltage command, so as to minimize the total loss in accordance with the torque command and the rotation. By this means, it has become possible to suppress the loss.

Particularly, when a vehicle runs with the power supplied from the battery 15, a large torque and a large output are required while the vehicle is being accelerated, but the required torque and output decreases when a constant speed operation at a prescribed speed is started. That is, while the vehicle is being accelerated, the command calculator 917 outputs various commands so that the boosting operation is performed. In this case, a current value smaller than the current value in which the loss becomes minimum is set for the D-axis current command, so that a large output can be obtained though the loss is large.

And, when the constant operation is started, and a low torque and a low output are required, the command calculator 917 outputs various commands (conduction ratio command 0) so that the boosting operation is not performed. In this case, a current value in which the loss becomes minimum is set for the D-axis current command.

In addition, there may be an apparatus which is not equipped with a boosting chopper or the above described single-phase PWM converter 20. However, such an apparatus will be able to modulate a DC voltage to a given DC voltage by using the method of setting the D-axis current command and the Q-axis current command.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in an embodiment, the filter capacitor 12 of the boosting chopper circuit 201 is composed of a capacitor, but may be composed of two capacitors connected in series, and the position between them may be earthed.

What is claimed is:

1. An electric vehicle control apparatus comprising:
   a converter having a diode and a switching device for converting an AC voltage or a first DC voltage supplied from an input side into a second DC voltage to be supplied to a main motor through an inverter;
   a battery connected to the converter through a reactor for supplying electric power to the converter;
   a boosting chopper circuit comprising the diode and the switching device included in the converter for boosting a voltage of the battery; and
   a backflow preventing diode placed between the battery and the converter for preventing a current from flowing in a direction to charge the battery.

2. An electric vehicle control apparatus comprising:
   a converter having a diode and a switching device for converting an AC voltage or a first DC voltage supplied from an input side into a second DC voltage to be supplied to a main motor through an inverter;
   a battery connected to the converter through a reactor for supplying electric power to the converter;
   a boosting chopper circuit comprising the diode and the switching device included in the converter for boosting a voltage of the battery; and
   a transformer for outputting the AC voltage based on input AC voltage,
   wherein the reactor is included in the boosting chopper circuit and corresponds to a secondary winding of the transformer.

3. An electric vehicle control apparatus comprising:
   a converter having a diode and a switching device for converting an AC voltage or a first DC voltage supplied from an input side into a second DC voltage to be supplied to a main motor through an inverter;
   a battery connected to the converter through a reactor for supplying electric power to the converter;
   a boosting chopper circuit comprising the diode and the switching device included in the converter for boosting a voltage of the battery;

a transformer for outputting the AC voltage based on input AC voltage;

a first contactor placed between the transformer and the converter at a positive side; and a second contactor placed between the battery and the converter at a negative side, wherein, when the electric power is supplied from the battery to the converter, the first contactor is switched to an open state and the second contactor is switched to a closed state.

4. An electric vehicle control apparatus comprising:

a converter having a diode and a switching device for converting an AC voltage or a first DC voltage supplied from an input side into a second DC voltage to be supplied to a main motor through an inverter;

a battery connected to the converter through a reactor for supplying electric power to the converter;

a boosting chopper circuit comprising the diode and the switching device included in the converter for boosting a voltage of the battery;

a voltage detecting unit for detecting a voltage value of the battery;

a current detecting unit for detecting a current value output from the battery; and a control unit for generating a switching signal to control the switching device of the boosting chopper circuit based on the detected voltage value, the detected current value, and a capacitor voltage command value.

5. An electric vehicle comprising:

a power collector for receiving electric power from a power line;

a converter having a diode and a switching device for converting an AC voltage of the electric power or a first DC voltage supplied from an input side into a second DC voltage to be supplied to a main motor through an inverter;

a battery connected to the converter through a reactor for supplying electric power to the converter;

a boosting chopper circuit comprising the diode and the switching device included in the converter for boosting a voltage of the battery; and a backflow preventing diode placed between the battery and the converter for preventing a current from flowing in a direction to charge the battery.

6. An electric vehicle comprising:

a power collector for receiving electric power from a power line;

a converter having a diode and a switching device for converting an AC voltage of the electric power or a first DC voltage supplied from an input side into a second DC voltage to be supplied to a main motor through an inverter;

a battery connected to the converter through a reactor for supplying electric power to the converter;

a boosting chopper circuit comprising the diode and the switching device included in the converter for boosting a voltage of the battery; and a transformer for outputting the AC voltage based on input AC voltage, wherein the reactor is included in the boosting chopper circuit and corresponds to a secondary winding of the transformer.

7. An electric vehicle comprising:

a power collector for receiving electric power from a power line;

a converter having a diode and a switching device for converting an AC voltage of the electric power or a first DC voltage supplied from an input side into a second DC voltage to be supplied to a main motor through an inverter;

a battery connected to the converter through a reactor for supplying electric power to the converter;

a boosting chopper circuit comprising the diode and the switching device included in the converter for boosting a voltage of the battery;

a transformer for outputting the AC voltage based on input AC voltage;

a first contactor placed between the transformer and the converter at a positive side; and a second contactor placed between the battery and the converter at a negative side.

8. An electric vehicle comprising:

a power collector for receiving electric power from a power line;

a converter having a diode and a switching device for converting an AC voltage of the electric power or a first DC voltage supplied from an input side into a second DC voltage to be supplied to a main motor through an inverter;

a battery connected to the converter through a reactor for supplying electric power to the converter;

a boosting chopper circuit comprising the diode and the switching device included in the converter for boosting a voltage of the battery;

a voltage detecting unit for detecting a voltage value of the battery;

a current detecting unit for detecting a current value output from the battery; and a control unit for generating a switching signal to control the switching device of the boosting chopper circuit based on the detected voltage value, the detected current value, and a capacitor voltage command value.

* * * * *